(12) United States Patent  (10) Patent No.: US 8,733,833 B2
Dickinson et al.  (45) Date of Patent: May 27, 2014

(54) SAFETY OR BOOSTER SEAT FOR USE IN CONJUNCTION WITH A VEHICLE

(76) Inventors: Simon Dickinson, Scarborough (GB); Amber Lee Dickinson, Scarborough (GB)

(*) Notice: Subject to any disclaimer, the term of this patent is extended or adjusted under 35 U.S.C. 154(b) by 51 days.

(21) Appl. No.: 12/667,134

(22) PCT Filed: Jul. 4, 2008

(86) PCT No.: PCT/GB2008/002312
§ 371 (c)(1),
(2), (4) Date: Jun. 21, 2010

(87) PCT Pub. No.: WO2009/004353
PCT Pub. Date: Jan. 8, 2009

(65) Prior Publication Data
US 2010/0276972 A1  Nov. 4, 2010

(30) Foreign Application Priority Data
Jul. 4, 2007 (GB) .................................... 0713010.7

(51) Int. Cl.
*B60N 2/28* (2006.01)
*B60N 2/42* (2006.01)
(52) U.S. Cl.
USPC .............. 297/216.11; 297/250.1; 297/452.41; 297/DIG. 3

(58) Field of Classification Search
USPC ................ 297/452.41, 216.11, 250.1, DIG. 3
See application file for complete search history.

(56) References Cited

U.S. PATENT DOCUMENTS

| 5,292,175 | A | * | 3/1994 | Artz | .......................... 297/452.41 |
| 5,335,968 | A | * | 8/1994 | Sheridan et al. | ........... 297/250.1 |
| 6,179,383 | B1 | * | 1/2001 | Ochi | ..................... 297/452.41 X |
| 7,748,781 | B2 | * | 7/2010 | Bass | ......................... 297/216.11 |

FOREIGN PATENT DOCUMENTS

| DE | 4333131 A1 | 3/1995 |
| EP | 0588540 A | 3/1994 |
| GB | 2168893 A | 7/1986 |
| WO | 01/13767 A | 3/2001 |

OTHER PUBLICATIONS

Search Report for co-pending PCT/GB2008/002312 listing relevant art cited by the International Searching Authority.

* cited by examiner

*Primary Examiner* — Anthony D Barfield
(74) *Attorney, Agent, or Firm* — McKee, Voorhees & Sease, P.L.C.

(57) ABSTRACT

The invention relates to an inflatable seat for use as a child safety seat when fitted to a vehicle seat. The seat can be moved between a compact storage condition and an inflacted in use condition. The seat includes a plurality of inflatable cells (16), the inflation of which and control of air between the same are controlled by air control means so as to prevent rapid loss or gain of air to or from a portion of the seat.

15 Claims, 8 Drawing Sheets

SAFETY OR BOOSTER SEAT FOR USE IN CONJUNCTION WITH A VEHICLE

The invention to which this application relates is to the provision of a seat of a type which can be used in conjunction with a vehicle car seat to provide a boost, i.e an increase in height, for a person, typically a child sitting on the same when in a vehicle, to position the child correctly for the safe fitting of the vehicle seat belt over the child's shoulder, and/or act as a safety seat i.e. act as a restraining means, and provide multi position impact and roll over protection, for a child sitting on the same in a vehicle.

The use of seats which are used in conjunction and in addition to vehicle seats, and which are placed on and supported by said vehicle seat, is known.

Typically, the known seats are manufactured from blown plastics material, hard polystyrene foam and/or metal frames, which, while they provide the required support for the child, can often present relatively hard surfaces which can be uncomfortable to the child and, furthermore, represent a risk of injury to the child upon the vehicle being in a collision.

Furthermore, the seats of this type, are relatively bulky which means that the same are difficult to transport when not in use on the vehicle seat, carry and/or store. It also means that in many instances, the seats are not used as often as they should be such as for example in taxis, coaches, hire cars, trips to and from the airport, and public transport. In the past, this non-use may have been tolerated as the use of the seats was impractical but, with increasingly stringent litigation, there is pressure for the safety or booster seats to be used at all times for children up to the age of 12 depending on their height.

It is also known to provide child seats which have portions which can be inflated but the practical implementation of these has been found to be problematic and can also cause discomfort to the child sitting on the same for prolonged periods of time.

An aim of the present invention is therefore to provide a child safety seat of a type which can be used in conjunction with a vehicle seat to provide additional safety, comfort and/or height to a person, typically a child, sitting on the same and to do so in a manner which allows the seat to be utilised to provide improved safety, improved storage and generally make the seats more readily available for use, and practical to use, as opposed to regular seats that are too cumbersome to carry when not in use in the car. It is a further aim to eliminate the problems which can be caused when the seat is prone to wobble if not secured properly and to provide the seat in a form which allows three of the same to be fitted in a back seat so all children are safe and adhering to new EU regulations. A yet further aim is to provide the seat in a form which allows support of spinal alignment, neck support if child falls asleep, lumbar support and the like.

In a first aspect of the invention, there is provided a seat for use in conjunction with a vehicle seat, said seat provided to be movable between a storage condition and an in-use condition by inflation of a plurality of inflatable cells provided in a predefined configuration throughout a core of said seat to define at least a base and wherein said seat is formed from a first layer of material which forms the core and a second layer of material which forms the external surface of the seat.

In one embodiment the first and second layers are laminated. Alternatively the second layer is provided as an outer housing. Typically the outer housing can be selectively placed over the core and also removed from the same. Typically the core is totally housed within the outer housing.

Typically, the seat incorporates a plurality of portions, each of said portions provided with at least one inflatable cell substantially formed therein.

In one embodiment, the portions comprise a head portion, a back portion and a base portion.

In one embodiment, the base and/or back portions include side portions which extend at least partially along opposing sides of the back and/or base portions and in one embodiment the head portion.

Preferably, the side portions, when provided, are formed such that, when inflated, the same are biased to lie at an angle to the back or base portions and thereby form side supports for a person sitting on the seat.

In one embodiment, the longitudinal axes of the inflatable cells of the back portion are substantially perpendicular to the longitudinal axes of the inflatable cells of the base portion.

Typically, the shape and gaps between the inflatable cells is selected so as to provide optimum support and comfort to a person when sitting on the seat and is intended to be of orthopaedic benefit to the child.

In one embodiment, the back, base and head portions and any side portions which are provided, are provided as an inner, air filled core, with said air filled core, in use, wholly located within or covered by an outer layer.

In one embodiment, the outer housing comprises an upper face on which the person sits, in use of the seat, and a rear face which typically contacts with the vehicle seat which provides support. In one embodiment the rear face includes or is formed of material which allows the grip of the child seat on the vehicle seat to be improved.

In one embodiment, the seat of the invention relies upon the shape and contour of the vehicle seat, to at least partially define the shape of the seat when placed thereon. This therefore allows the seat in accordance with the invention to be provided without the need for a rigid frame as the inflated chambers in conjunction with the outer material will give the seat sufficient solid form without relying on the vehicle seat to help define its form.

Typically, the fit between the inner core and the outer housing, is such that the top face of the outer housing spans any gaps or indents between respective inflatable cells. The bridging of these gaps, can be achieved solely by the tension of the material of the outer housing but more typically is achieved in conjunction with the provision of formations which are shaped and positioned so as to lie in the gaps. This therefore means that the face of the outer housing on which the person sits, is substantially smooth and thereby improves the comfort of the person sitting on the chair and is supported by the inflated cells directly and/or by the formations on the inner surface of the housing interacting with the inflated core.

In one embodiment, engagement means are provided which allow the attachment to and engagement of the outer housing and the inner structure. Preferably, these engagement means are releasable so as to allow the outer housing to be removed and stored separately to the inner structure and/or washed separately to the inner structure.

Typically the seat core in accordance with the invention can be deflated or folded to reduce the size of the seat to a minimum and thereby move the same to a storage condition, or become portable enough to carry easily or be placed in luggage, stowed on a bus or taxi.

In one embodiment, the seat in accordance with the invention includes one or more location means formed therein, to allow the location and/or passage of a vehicle safety belt which allows the securement of the seat in accordance with the invention to the vehicle seat. In addition, or alternatively, additional attachment means can be provided which locate with the seat in accordance with the invention and anchor the same to the safety belt system of the vehicle or to the chassis or seat of the vehicle. For example the ISOfix (registered trade mark) points available on most cars. In another embodiment a frame can be used in conjunction with the seat to allow the seat to be secured to the frame and the frame in turn to be secured to the Isofix fitments.

In one embodiment an audible and/or visual indicator is provided as part of the seat to indicate the under inflation of the seat for use in that the pressure of the air in the seat is not sufficient for the seat to be used. In one embodiment the indicator includes a pressure sensor which detects when the pressure of the air reaches an acceptable level.

In accordance with the present invention there is therefore provided a seat which can be used to support a person, such as a child, in a raised seated position and/or provide additional restraint or safety to that person. At the same time, the seat does not in itself act as a potential hazard in the vehicle as there are no rigid or potentially harmful hard surfaces on the same. Instead, because the seat is provided, when in use, in an inflated condition, the seat does not act as an injury hazard and indeed can act as an absorbing means to absorb impact and hence reduce injury caused by a vehicle collision.

Furthermore, the ability to move the seat between a collapsed, deflated storage position and an in-use position, means that, in the storage position, the seat is more likely to be transported to different locations of use, and, as a result of this, is more likely to be used at different locations and therefore is found to greatly improve the safety of children, even when transported in public transport or in other vehicles.

In one embodiment the back and headrest portions are separable from the base portion so that, if required the base portion only can be used as a booster seat.

Typically the air cells can be interconnected to allow inflation and deflation via one valve provided on the seat. However the size of the passages deflated between the cells can be selected to ensure that the passage of air between the cells during use of the seat is controlled to optimize and control the seat's comfort and safety performance. In one embodiment the seat includes a pressure relief valve so as to prevent over inflation of the seat and ensure that the same is at optimum pressure for comfort and safety. In one embodiment the material used is water resistant and can be TPU/PU material.

In one embodiment the seat contains at least one air valve.

In one embodiment the seat contains at least one air input valve and an output valve. Typically the input valve is a one way or non-return valve for inflating the seat and further typically the output valve is also a one way or non-return valve for deflating the seat. Preferably the input and output valves are located on a single inflation/deflation unit on the seat.

In one embodiment the pressure relief valve is incorporated into the output valve. Typically the output valve includes a function whereby a rotation of part of the valve opens the same and allows the rapid release of air and/or deflation of the seat.

In one embodiment the seat contains at least one pressure indicator. Typically the pressure indicator undergoes a change in condition which indicates the pressure inside the seat. This allows a person to inflate the seat to the correct pressure or in the correct pressure range to optimize the seat's safety performance.

In one embodiment the pressure indicator is in communication with the output and/or pressure relief valve thereby allowing at least some air to exit the seat if it is overinflated. Typically the pressure indicator is a gauge or transducer and/or the like. Further typically the pressure indicator is a Bourdon-type gauge where a pointer or needle indicates the pressure inside the seat.

In one embodiment the seat includes a temperature indicator which undergoes a change in condition to indicate the temperature of the air inside and/or outside the seat.

In one embodiment the pressure and temperature indicators are located on the same unit.

In one embodiment the seat includes a display indicating the pressure(s) and/or temperature(s). Typically the display is an LCD display. Typically the display is in communication with the indicators and is located a spaced distance away from the same. Alternatively, the display and at least some of the indicators are located in a single unit.

In one embodiment the seat includes an outer cover for the same.

In one embodiment the seat includes a harness means. Typically the harness means is formed substantially integrally with the seat.

In one embodiment the seat includes one or more belt location means and belt guides. Typically, the location means are situated to guide the vehicle safety belts and/or the seat's harness substantially around and/or across the lap and/or shoulder portions of the seat. Further typically said belt guide means facilitate the fixing and/or securement of the seat.

In one embodiment at least part of the belt location means are constructed from a substantially rigid material. Typically the belt guide means are substantially constructed from rigid plastic material or foam. Further typically the belt guide means contain at least one recess and/or aperture for the location and/or guidance of at least a portion of a belt to be substantially located therein in use. In one embodiment the lap belt guide can be constructed from an inflatable portion, using the air pressure when inflated to give the portion its rigidity. Alternatively, the lap belt guide can be made from a relatively rigid material.

In one embodiment at least one belt location means is located inside at least one of the base portions sides to provide a lap belt guide.

In one embodiment a shoulder belt guide is provided which is adjustable in position on the seat so as to accommodate the different size of the person who sits in the seat.

In one embodiment the guide includes a first component which wraps round the belt and through which the belt can slide, said first component being adjustably received and held on the seat and secured thereto by at least one flap which can be moved to overlie said first component to secure the same in position. In one embodiment the securing of the components is achieved by using hook and loop fastening means.

In one embodiment at least one belt location means is attached to the outer cover. Typically the shoulder belt location means is attached to outer cover. More typically the belt location means attached to the outer cover substantially comprises an adjustable loop of material.

In one embodiment the location means attached to the outer cover is includes Velcro. Typically the guide means is a sandwich of Velcro.

Typically at least one location means is included on one or more sides of the seat.

In one embodiment there is at least one hook and loop fastening means portion on the cover. Typically there is at least one additional hook and loop fastening means portion positioned substantially around the belt and the same is attached to the hook and loop fastening means portion on the cover to allow the same to be released.

In one embodiment at least one of the belt location means contains expanded foam. Typically the foam is expanded polypropylene (EPP) foam and/or EVA foam.

In one embodiment the at least one of the base sides of the seat is substantially constructed from EPP foam. Typically the base side includes a lap belt guide means.

In one embodiment at least one base side and at least one backrest side form a belt guide means for the location of a seatbelt between the same. Typically the at least one base side and at least one backrest side are constructed from expanded foam.

In one embodiment at least one surface of the seat includes at least a portion of a material which has the characteristic of greater friction, thereby helping to retain the seat in position on the vehicle seat. Typically, this frictional material is included on a portion of at least one of the surfaces which contact the vehicle seat to prevent the seat from slipping on the same. Preferably the frictional material is located at least on the bottom surface of the base of the seat. In one embodiment the frictional material is also provided on the rear of the back of the seat and/or the front of the seat. In one embodiment the seat includes frictional material on a portion of the surface to prevent the occupant of the seat and/or a cover for the seat from slipping on the same.

The frictional material can be backed, laminated, sewn or welded to a backing layer that can be shaped to allow the surface of the same come into contact with the vehicle seat and thereby give the desired frictional contact.

In one embodiment the frictional material protects the seat when in the storage condition. Typically when in the storage condition the substantially thicker and/or stronger material of the frictional material protects the seat from being punctured and/or the like.

In one embodiment the seat back and/or base is shaped so as to ensure that the same come into contact with the vehicle seat as much as possible thereby improving the stability of the seat and securing of the same in position when in use.

In one embodiment the seat includes at least one tether. Typically the tether includes one or more ends one of which are attached to the back and/or headrest portions and the other end to a different surface such as the vehicle seat, chassis, and/or the like.

In one embodiment the outer cover for the seat includes at least a portion of reinforced material. Typically the material is reinforced and/or stitched and/or non-stretch woven material.

In one embodiment the outer cover helps to substantially reduce and/or contain the movement of the seat when inflated in use. Typically the outer cover provides at least some protection to the seat from puncturing.

In one embodiment the outer cover for the seat includes foam material. Typically this foam is included as backing and provides at least some increased comfort to the user. Preferably the foam backing is fire retardant.

In one embodiment the outer cover is substantially constructed from recyclable materials. Typically the material is a plastic material. Preferably the material is a polyurethane such as TPU and/or the like.

In one embodiment the seat includes one or more I-beam members internally therefor. Typically the members are I shaped in cross section and includes reinforced welds which substantially connect opposite walls of the seat, typically the front and rear walls For example one or more I-beam members can connect the front and rear portions of the seat backrest portions and/or the top and bottom portions of the base. Preferably the I-beams are included to define the cells of the core which are to be inflated and provide support and/or stability and/or strength to the seat portions where required.

In one embodiment the seat includes one or more air passage control means which in one embodiment can be provided in the walls between adjacent cells which are to be inflated. In one embodiment these control means are in the form of apertures or gaps between the inflatable cells. Typically the apertures and/or gaps are provided of a predetermined size so as to allow a determinable amount of air to pass therethrough at any given time. This therefore allows the normal inflation and deflation of the seat core to be achieved but also prevents a sudden movement of air to or from any given part of the seat, which could potentially be damaging or injurious to the person in the seat. The control means therefore provide for the controlled flow of air within the seat between inflatable cells.

In one embodiment the air control means allow the controlled flow of air between the base and the backrest and substantially prevents the re-entrance of air into the base and thereby prevents a catapult effect or trampoline effect from projecting the occupant forwards or upwards when the vehicle in which the seat is located is in a collision.

In one embodiment the seat includes a detachably attached footrest portion and/or neck pillow portion. Typically these portions are attached using Velcro and/or the like.

In one embodiment the side portions of the seat are adjustable. Typically the one or more side portions can be moved in a plurality of directions to be joined together and substantially adjust the position of the head portion.

This side portion adjustment allows the head portion to substantially fit into the car seat shape.

Typically the adjustment of the side and/or head portions increase the amount and/or degree of protection around the occupant.

Typically all parts of the seat provide at least some shock absorption properties.

Specific embodiments of the invention will now be described, wherein:

FIGS. 1 to 3 illustrate a seat in accordance with the invention in one embodiment, in use and in elevation, plan and side elevation respectively;

FIGS. 4*a-g* illustrate various views of a seat in accordance with an embodiment of the invention;

FIGS. 5*a* and *b* illustrate a seat in accordance with one embodiment of the invention;

Figure 1:
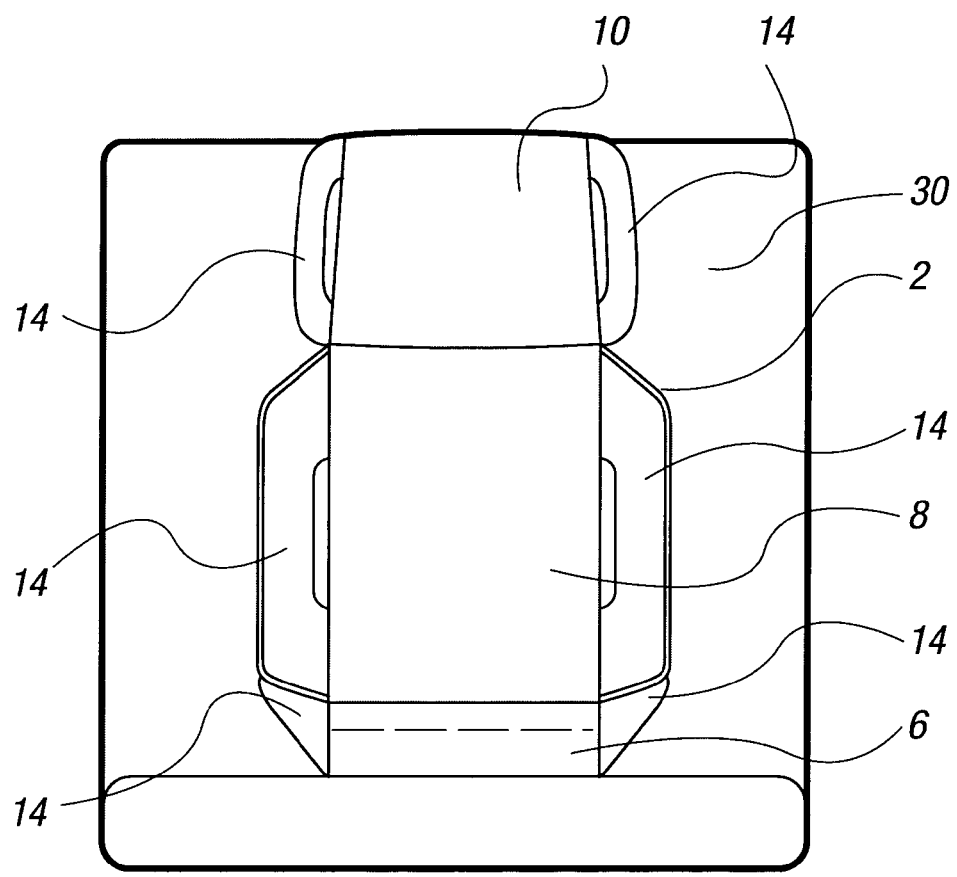
Figure 2:
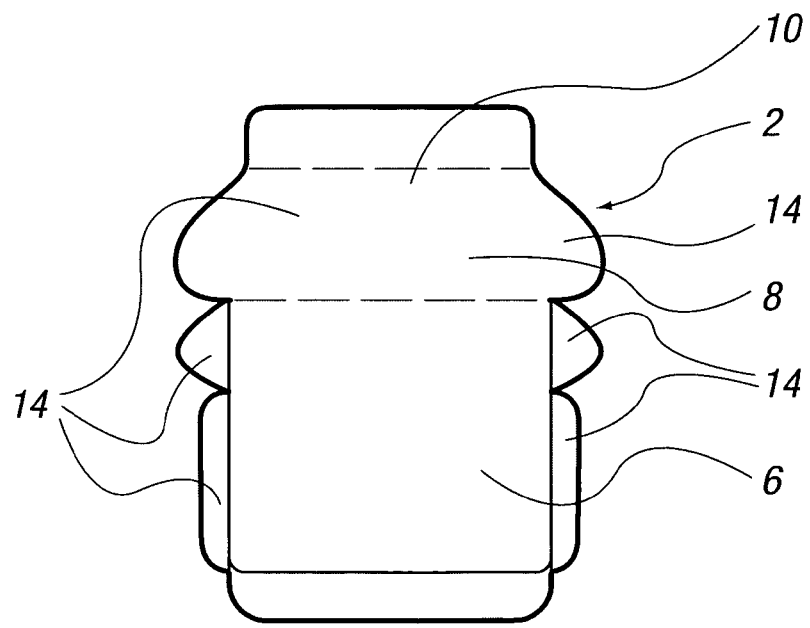
Figure 3:
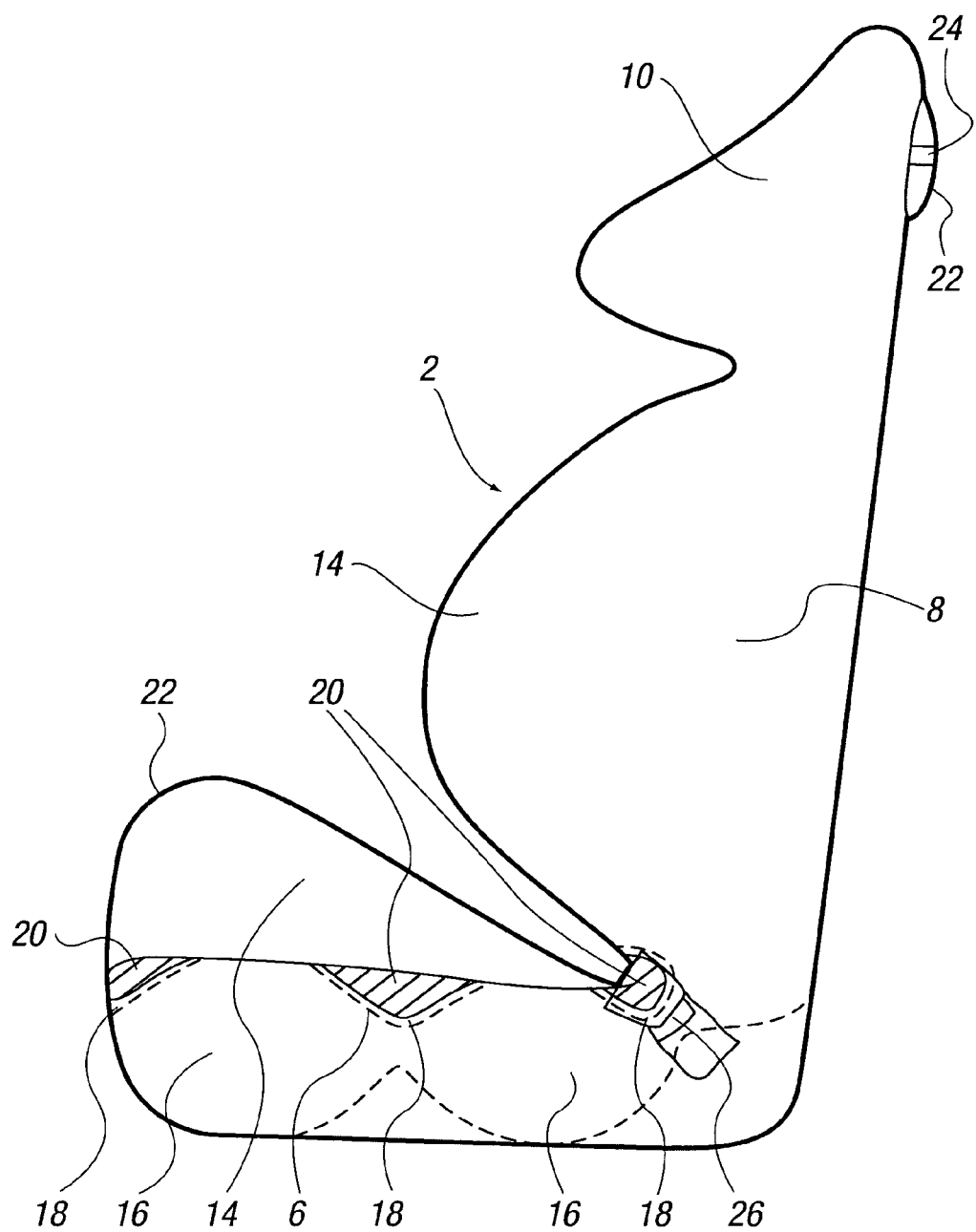

Referring firstly to FIG. 1-3 there is illustrated a first embodiment of the invention in which there is provided a seat 2 formed from a series of portions comprising a base portion 6, back portion 8 and head portion 10. In this case, all the portions each respectively have side portions 14 formed at opposing side edges thereof. It will also be seen how the side portions are angled to lie forward at an angle to the plane of the portions and, when a child is sitting on the seat on the back and base portions, the side portions provide support to each side of the child thereby helping to retain the child in their proper position and also providing protection to the sides of the child in case of side impact from an outside force.

Each of the portions incorporate a plurality of inflatable cells 16.

Figure 4A:
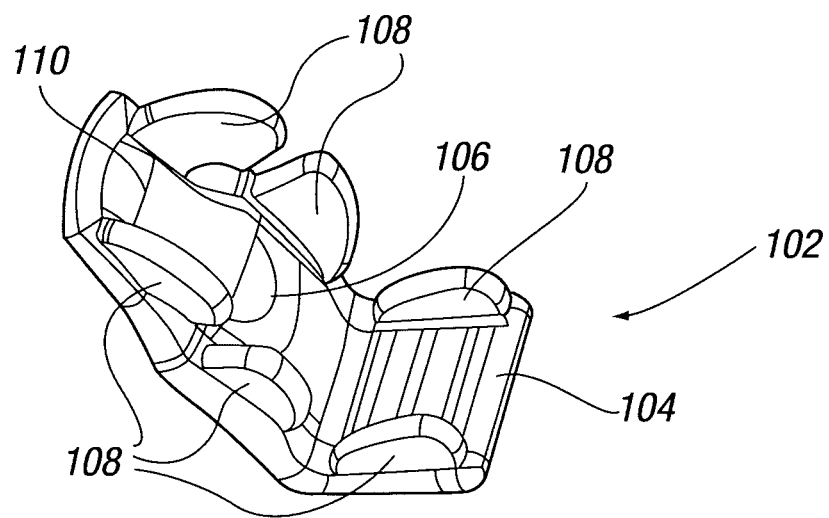
Figure 4B:
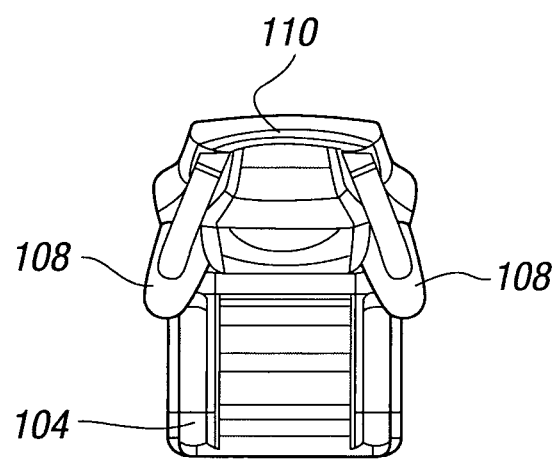
Figure 4C:
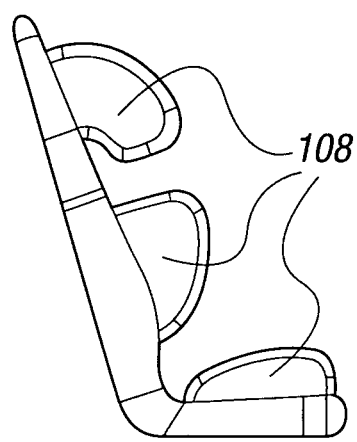
Figure 4D:
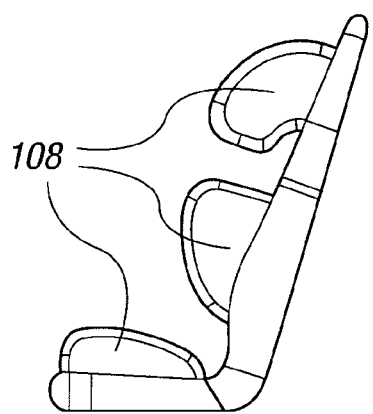
Figure 4E:
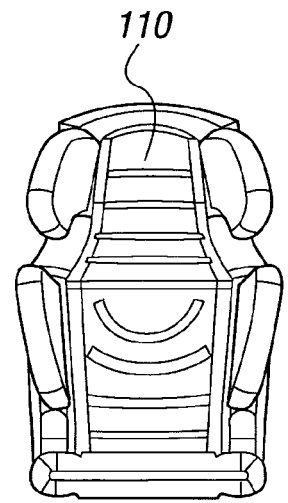
Figure 4F:
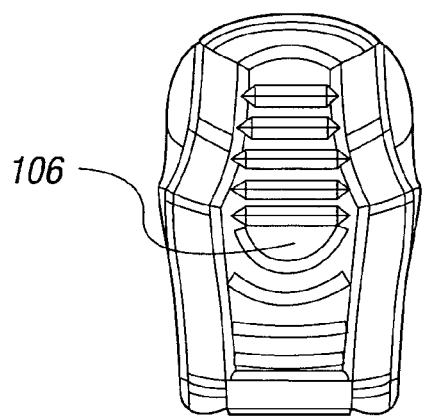
Figure 4G:
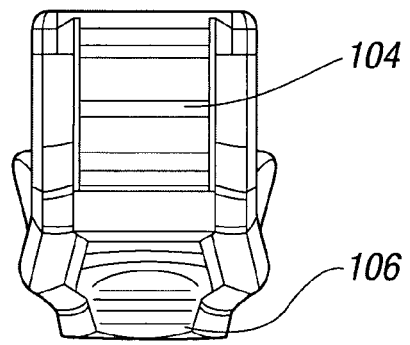

Preferably, although not necessarily always the case, the cells can be inflated and deflated via a single valve opening, with each of the inflatable cells connected to one another via passages which allow the inflating gas to pass between the same and also the deflating gas to pass back towards the open valve. Thus, in a preferred embodiment, the inner core which is shown in FIGS. 4*a* and *b*, is enclosed within an outer housing 22 as shown in FIGS. 1 and 3. The seat is provided with an outer layer which can in on embodiment be laminated or otherwise attached to the material which defines the core of the seat. Alternatively and as shown in these drawings the outer layer is provided in the form of an outer housing which can, in one embodiment, comprise sheet material of a size and dimension and tension, which when fitted around the inner core, causes the gaps 18 between the inflatable cells 16. More preferably, as illustrated in FIG. 3 with regard to the base, the outer housing includes, at the necessary locations, formations 20 typically of padded material, which serve to fill in the gaps 18 and hence locate the formations in the gaps, thereby providing a substantially consistent outer surface on the back, head and base onto which the person contacts.

The outer can be formed of any suitable appearance and may be provided with decorative patterns to suit particular uses. Storage portions or pockets can also be provided on the outer housing. In one embodiment the outer is formed as a separate housing which can be placed around the core. Alternatively the outer can be laminated to the layer which forms the core of the seat and defines the inflatable cells.

Preferably, the outer housing is removable from the inner structure, to allow the housing to be washable. Engagement means, in this case in the form of studs 24, can be provided on the inner face of the outer housing 22 and the outer face of the inner core at matching locations, so as to allow the engagement of the outer housing with the inner structure when in use and thereby retain the two portions of the seat in the required relationship.

Suitable seat belt location means 26 are provided on the seat, so as to allow the seat belt 28 of the vehicle seat on which the seat in accordance with the invention is provided, to be used to retain the seat in position. The same seat belt can also be used to pass round the child sitting on the seat and thereby secure the child and seat in position in the vehicle.

In order to move the seat between the storage and in-use conditions, the seat is typically unfolded or rolled out from the storage position and then air or gas introduced to inflate the cells via the valve. Once inflated to a particular level, the seat is then ready to be placed onto the seat of the vehicle and typically the seat of the invention follows the contours of the vehicle seat 30 which act to support the same. It is found that this allows greater comfort to the user and makes the shaping of the seat more adaptable.

In one embodiment, the inflating valve or another portion of the seat, may be provided with an indication means to indicate that an appropriate inflation pressure has been achieved and which inflating pressure allows the seat to be acceptable for use. In one embodiment, a further indication means may be provided to indicate to the user if the inflation level decreases over a time of use and thereby requires the seat to be further inflated. This may be in the form of an audible and/or visual alarm which can alert the user to the under inflation and possible danger of the seat when in this condition, in use. The alarm may include a pressure sensor which senses when the device has reached a particular predetermined level.

In one embodiment the inflatable cells of the base portion 6 are provided with a longitudinal axis in a first direction and the cells of the back and head portions 8, 10 have their longitudinal axes in a perpendicular orientation. Alternatively, as shown in FIG. 4 some of the cells may be curved so as to add to the safety and/or comfort of the user. The orientation of the cells can be adjusted and selected to provide the most suitable comfort, safety and orthopaedic alignment of the child sitting on the seat.

Turning now to FIG. 4*a*, which shows a perspective view of an inflatable seat 102 which is intended for use in a vehicle in accordance with another embodiment of the invention, it can be seen that the seat comprises a plurality of portions which include a base portion 104, back portion 106, side portions 108 and a head portion 110. Each of the portions contains at least one inflatable cell (not shown) which is inflated to move the seat from a storage condition to an in use condition. The seat 102 is shaped to sit on and complement the shape of a vehicle seat. The vehicle is usually a car, van or taxi or the like but can also include mini-buses, buses, planes and trains and the like. The seat 102 is inflatable to provide improved comfort and also protect the occupant of the seat, typically a child, from injury in the event of a crash. The side portions 108 protect the child from lateral movement due to a side impact and the inflatable construction of the seat 102 ensures that the same is at least partially impact absorbing and comfortable for the occupant.

Figure 5A:
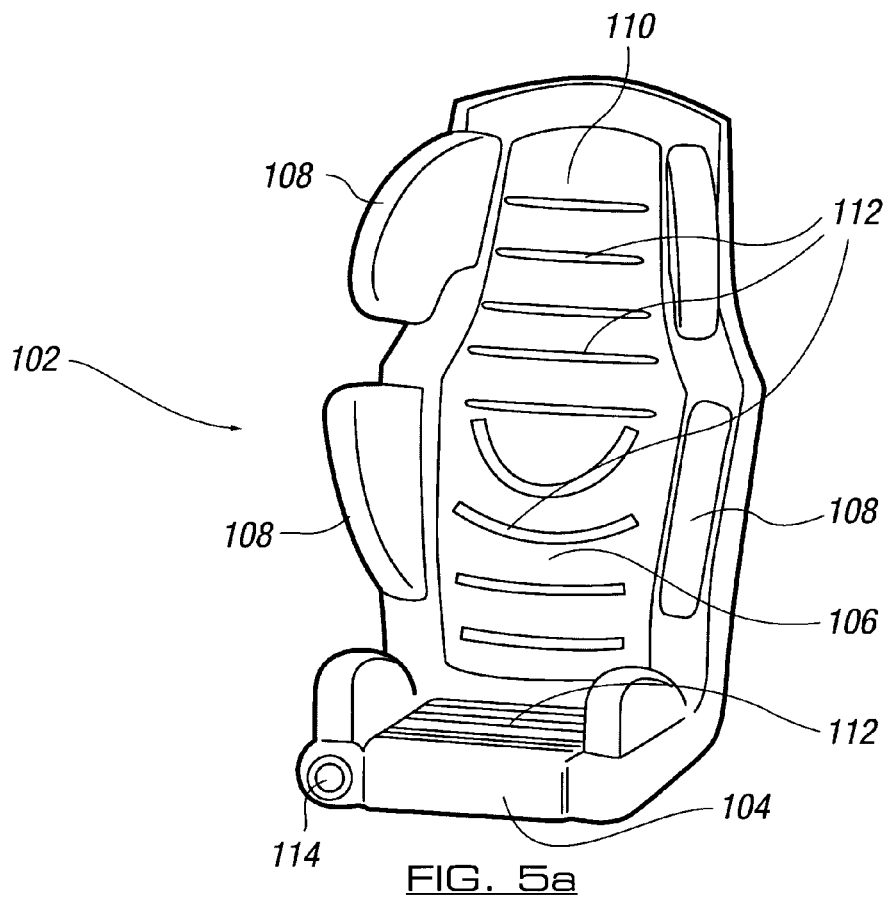
Figure 5B:
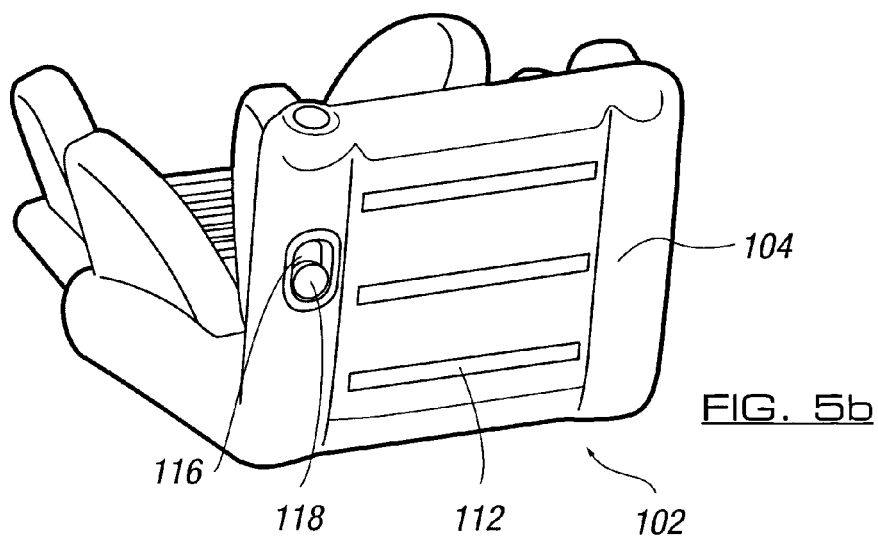

FIG. 5*a* shows the front perspective view of one embodiment of the invention, the seat 102 has a number of recesses 112 located on the back 106, base 104 and head 110 portions. These recesses provide a dual purpose of providing some structure to the inflated set and also allow some air to circulate between the occupant and the seat itself, thereby improving comfort for the occupant even more. FIGS. 5*a* and 5*b* also show a pressure gauge 114 which is incorporated into the base portion 104 of the seat 102.

The pressure gauge 114 in this embodiment provides an indication of the pressure of the air inside the seat 102. This indication shows the optimum levels of inflation and also indicates if the air pressure is becoming too high. FIG. 5*b*, the view of the bottom of the base portion, also shows the input (inflation) 116 and output (deflation) 118 valves located therein. Typically the output valve incorporates a pressure release function or pressure regulator which opens if the air pressure inside the seat becomes too large. The valves are typically actuated by rotating the same. In this embodiment the air can be released from the seat 102 by turning the output valve 118 by 90 degrees. This opens the valve and allows the air contained in the seat to escape.

Figure 6:
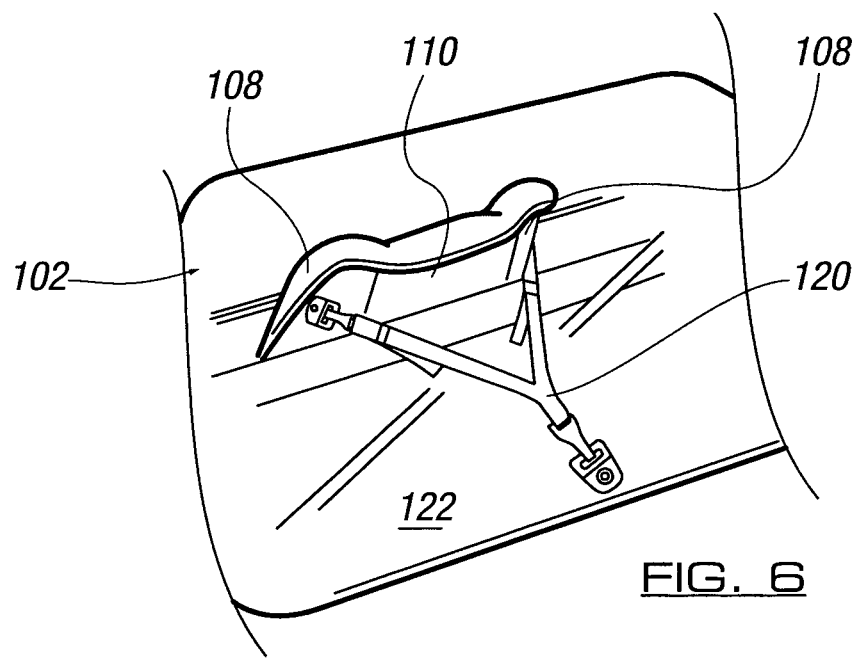
FIG. 6 illustrates a seat equipped with a tether in use in accordance with one embodiment of the invention.

FIG. 6 shows a seat 102 equipped with a tether 120. The tether is attached to the side portions 108 of the head portion 110 and the rear parcel shelf 122 of the vehicle in which the seat is situated. The tethering in this manner provides extra stability to the head 110 and back 106 portions of the seat and prevents them swinging forward in the event that the vehicle has to stop suddenly.

Figure 7:
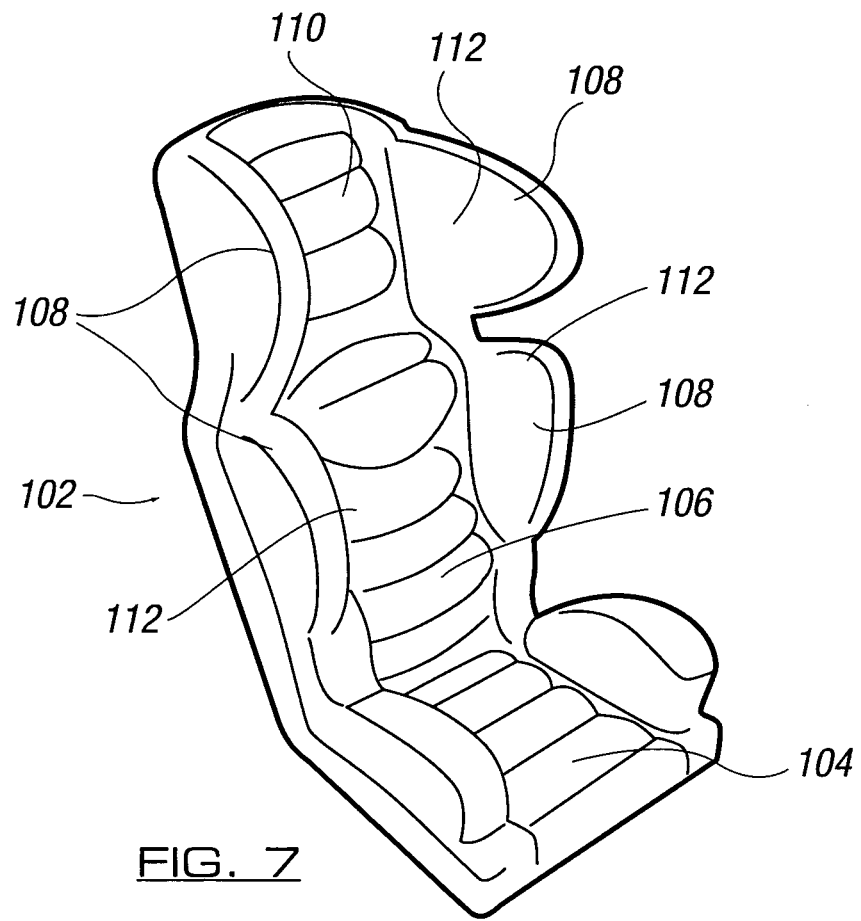
FIG. 7 illustrates picture of one embodiment of the invention.
Figure 8:
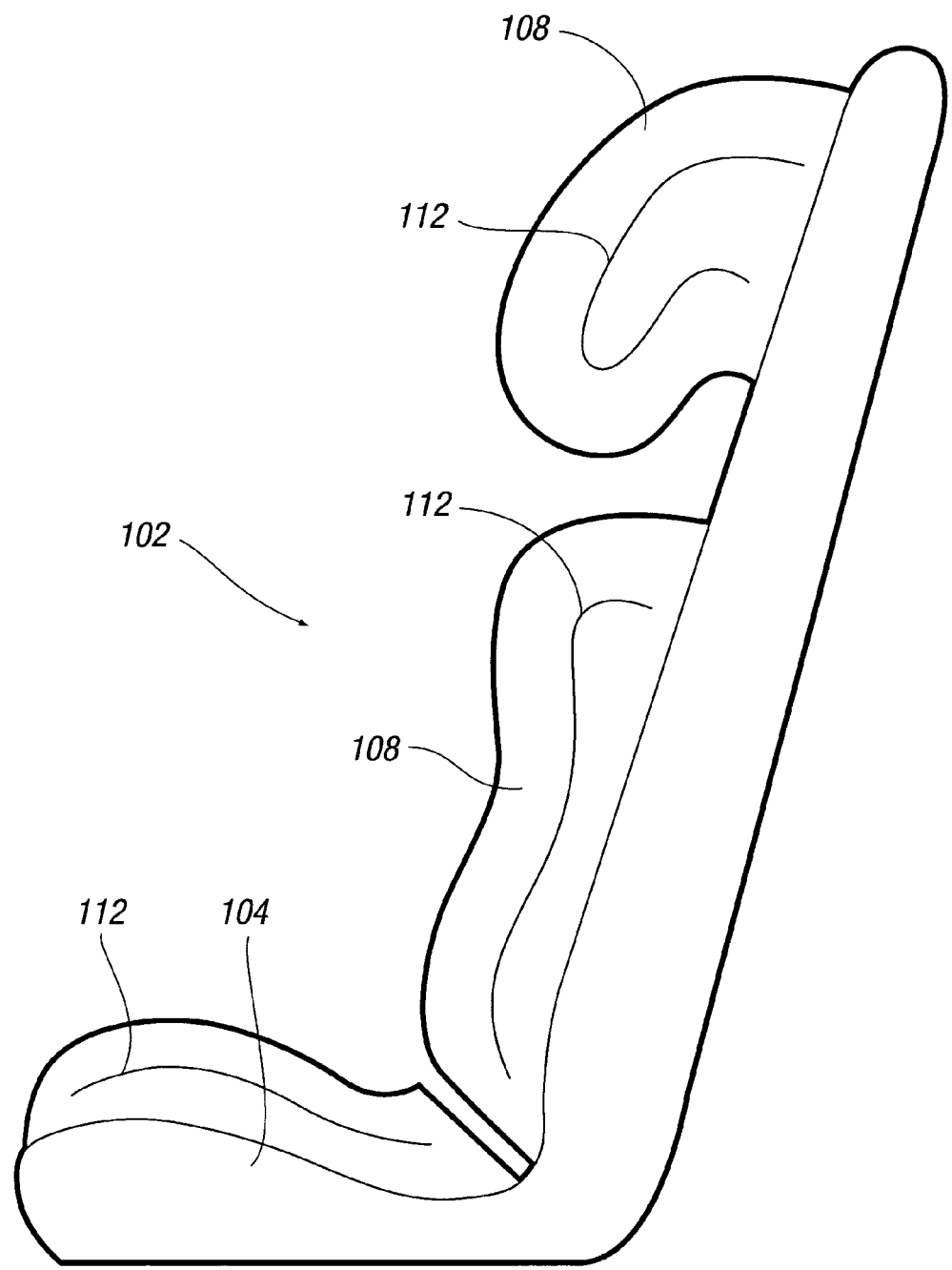
FIG. 8 illustrates a side view sketch of an embodiment of the invention.

FIGS. 7 and 8 show an embodiment of the invention wherein the entire seat 102 is inflated. It can be seen from these figures that the recesses 112 provide ridges which give extra stability to the seat structure whilst also providing extra comfort. The side portions 108 of the seat 102 also have two functions, the first is to provide support and comfort to the user and second, to provide protection to the user in the event of a side-on collision. In some embodiments the base 104 or other parts of the seat may contain expanded foam or the like to give additional stability to that portion and/or the seat as a whole.

FIG. 8 shows that the device can be inflated to provide quite a large and protecting seat for the occupant but it can also be deflated to take up a much smaller volume for ease of transportation and the like.

Figure 9A:
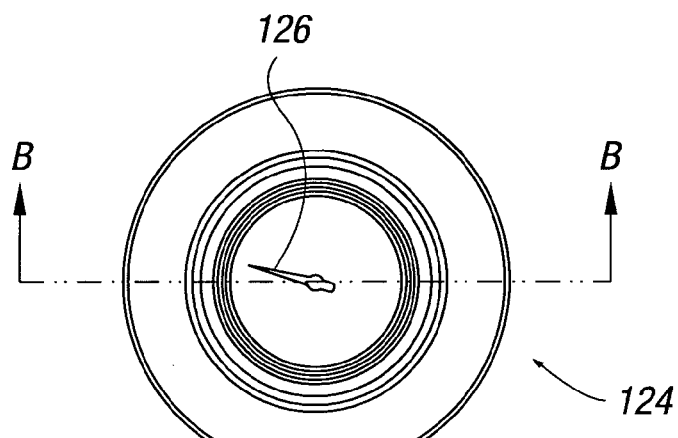
FIGS. 9*a-c* show an illustration of a pressure gauge for use in accordance with one embodiment of the invention.
Figure 9B:
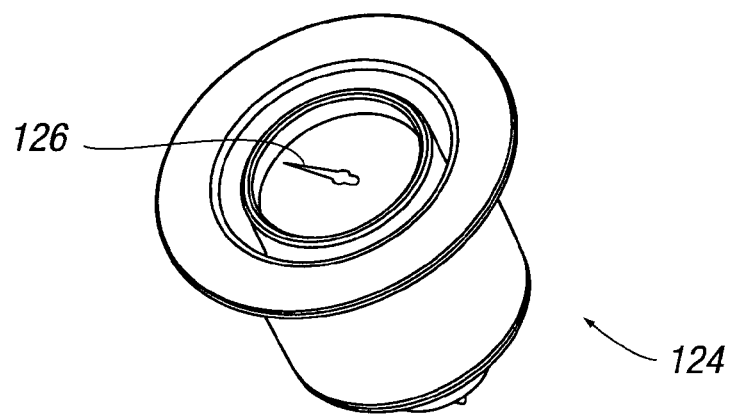
Figure 9C:
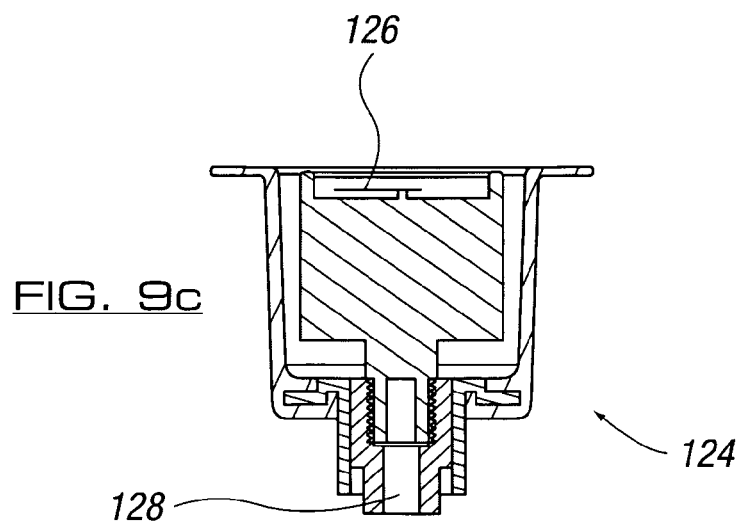

FIG. 9a-c shows an embodiment of a pressure gauge 124 used in accordance with an embodiment of the invention. In this particular embodiment the pressure gauge 124 is of the Bourdon-type, whereby a needle 126 indicates on a scale the pressure of the air inside the seat 102 (not shown). The rear or the gauge 128 is exposed to the pressure inside the seat and indicates the same on the scale. This prevents the seat being under or over inflated. Alternatively a transducer type indicator could be used to give an electrical indication. Typically the transducer-type indicators incorporate piezoelectric components. Both types of indicators can be linked to the input (inflation) 116 and/or output (deflation) 118 valves (not shown) to control the pressure of the air inside the seat. This would ensure that the pressure does not become too high and/or too low by being in operable communication with said valves. In one embodiment an audible and/or visual alarm can be created when the pressure gets too low.

It will therefore be appreciated that the seat in accordance with the invention, provides increased comfort to the user, is more storable, portable and allows the posture of a person sitting on the seat, to be more appropriate to a child. This also provides added safety due to the design and materials used in inner core and outer casings not currently available in the market due to the use of hard plastics. It is also found that the nature of the seat means that in a vehicle collision the seat tends to take the shape and support of the vehicle seat, thereby increasing the safety and protection of the occupant. It should also be noted that although the same has been described with reference to a seat for vehicle, the seat may also be used in conjunction with other support surfaces such as other types of seats for, example, wheelchairs.

The invention claimed is:

1. An inflatable seat for use as or, in conjunction with, a vehicle seat, by inflation of a plurality of inflatable cells provided in a predefined configuration throughout a core of said seat to define at least a base said seat is formed from a first layer of material which forms the core and a second layer of material which forms the external surface of the seat and wherein at least some of the inflatable cells which, in combination, form the base are defined by one or more I-beam members joining opposing walls of the core together and each of said inflatable cells are interconnected by air control means which include one or more apertures or passages formed in the I-beam members wherein said air control means are provided of a size to allow air to pass through the same during deflation or inflation of the base and to allow the flow of air between adjacent inflatable cells in both directions while restricting the rate of flow of air between the adjacent inflatable cells when the base is in use in an inflated condition so as to prevent rapid movement of air between said inflatable cells in said base so as to prevent rapid loss or gain of air to or from a portion of the seat, and said air is retained within the seat when the seat is in use in an inflated condition.

2. A seat according to claim 1 wherein the seat incorporates a base portion and a back portion, said portions provided with at least one inflatable cell substantially formed therein.

3. A seat according to claim 2 wherein the base and/or back portions include one or more side portions which extend at least partially along the sides of the back and/or base portions.

4. A seat according to claim 2 wherein the seat has a head portion, said head portion including one or more side portions.

5. A seat according to claim 1 wherein attachment means are provided that locate the seat and anchor the same to the safety belt system and/or the chassis and/or the seat of the vehicle.

6. A seat according to claim 5 wherein the attachment means for the safety belt are constructed of substantially rigid material.

7. A seat according to claim 1 wherein the base and back portions are separable to allow the base portion to be selectively used as a booster seat in use.

8. A seat according to claim 1 wherein the seat contains at least one valve.

9. A seat according to claim 1 wherein upon the vehicle being in a collision the rapid movement of air in the seat is restricted by the air control means.

10. A seat according to claim 1 wherein the seat includes at least one pressure relief valve.

11. A seat according to claim 1 wherein the seat includes a pressure indicator.

12. A seat according to claim 11 wherein the pressure indictor acts as an alarm to indicate when the air pressure in the seat falls below a predefined level.

13. A seat according to claim 1 wherein the seat includes at least one temperature indicator.

14. A seat according to claim 1 wherein the seat includes one or more harness means.

15. A seat according to claim 1 wherein the seat includes a top tether to secure the seat to the vehicle seat and/or chassis.

* * * * *